(12) United States Patent
Zhou et al.

(10) Patent No.: US 8,467,380 B2
(45) Date of Patent: Jun. 18, 2013

(54) CODING METHOD, USER EQUIPMENT AND SYSTEM BASED ON MEASURING QUALITY OF EXPERIENCE OF USER

(75) Inventors: Juejia Zhou, Beijing (CN); Yong Bai, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 362 days.

(21) Appl. No.: 12/814,348

(22) Filed: Jun. 11, 2010

(65) Prior Publication Data

US 2010/0315968 A1 Dec. 16, 2010

(30) Foreign Application Priority Data

Jun. 12, 2009 (CN) .......................... 2009 1 0147452

(51) Int. Cl.
*H04L 12/64* (2006.01)
(52) U.S. Cl.
USPC ............................ 370/352; 709/231; 709/232
(58) Field of Classification Search
None
See application file for complete search history.

(56) References Cited

U.S. PATENT DOCUMENTS

| 6,671,326 | B1* | 12/2003 | Tortelier ........................ 375/262 |
|---|---|---|---|
| 7,295,549 | B2* | 11/2007 | Pepin et al. .................... 370/352 |
| 7,889,703 | B2* | 2/2011 | Yang et al. ..................... 370/335 |
| 2004/0160979 | A1* | 8/2004 | Pepin et al. .................... 370/462 |
| 2004/0252700 | A1* | 12/2004 | Anandakumar et al. . 370/395.21 |
| 2005/0089043 | A1* | 4/2005 | Seckin et al. ............. 370/395.21 |
| 2006/0039280 | A1* | 2/2006 | Anandakumar et al. ...... 370/229 |
| 2009/0180430 | A1* | 7/2009 | Fadell ........................... 370/329 |
| 2010/0053300 | A1* | 3/2010 | Einarsson et al. .......... 348/14.01 |
| 2010/0165857 | A1* | 7/2010 | Meylan et al. ................ 370/252 |
| 2011/0310837 | A1* | 12/2011 | Classon et al. ................ 370/329 |

* cited by examiner

Primary Examiner — Robert Scheibel
(74) Attorney, Agent, or Firm — Blakely, Sokoloff, Taylor & Zafman LLP

(57) ABSTRACT

This invention provides a coding method, user equipment and system based on measuring Quality of Experience (QoE) of a user. The method includes: measuring, at destination user equipment, a QoE value; comparing the measured QoE value with a QoE threshold; adjusting at least one of a source coding rate and a channel coding mode according to a result of the comparison; and coding according to the adjusted source coding rate and/or channel coding mode; or further performing wireless resource allocation according to the adjusted coding scheme. Such method, user equipment and system of this invention adjust the coding technique according to the QoE, thus making the wireless resource used reasonably.

14 Claims, 5 Drawing Sheets

CODING METHOD, USER EQUIPMENT AND SYSTEM BASED ON MEASURING QUALITY OF EXPERIENCE OF USER

The present application claims priority to and incorporates by reference the entire contents of Chinese patent application No. 200910147452.1, filed in China on Jun. 12, 2009.

FIELD OF THE INVENTION

The present invention relates to wireless communication technologies, and particularly to a coding method, user equipment and system based on measuring Quality of Experience of user.

BACKGROUND OF THE INVENTION

Existing coding techniques mainly include two parts: source coding and channel coding. Regarding the source coding, because conventional networks use circuit switch, the source coding is typically at a fixed rate in the conventional networks. In the field of IP phone born over the Internet, Adaptive Multi-Rate (AMR) techniques can be used to change the coding rate of a user, and the change of the coding rate is usually controlled based on network resource conditions, such as network bandwidth, etc.

Regarding the channel coding, the mode thereof is mainly set according to a service type. For example, Adaptive Modulation and Coding (AMC) is one of the techniques used in the channel coding, and adaptively changes the modulation and coding manner according to channel conditions. Herein, the channel conditions may be estimated by the Channel Quality Indicator (CQI) feedback scheme of a receiver. The AMC technique is widely used in wireless communication systems such as mobile communication systems and Digital Video Broadcasting (DVB) systems so as to improve transmission efficiency and capability of the system. In specific applications, depending on different service types, a VoIP user is set as not using the AMC and a Data user is set as using the AMC. This results in a problem that resource usage efficiency of the VoIP user is low, which may lead to potential wireless resource waste.

As can be seen, an appropriate coding technique may be greatly desired for reasonable resource usage.

SUMMARY OF THE INVENTION

In view of the above, embodiments of the present invention are to adjust a coding technique according to Quality of Experience (QoE) of a user, which make more efficient use of wireless resources and further increase system capacity while ensure that more users have good QoE.

The technical solutions of the present invention are specifically implemented as follows:

A coding method based on measuring Quality of Experience (QoE) of a user includes:

measuring, at destination user equipment, a QoE value; comparing the measured QoE value with a QoE threshold; adjusting at least one of a source coding rate and a channel coding mode according to a result of the comparison; and coding according to the adjusted source coding rate and/or channel coding mode.

User equipment includes:

a user Quality of Experience (QoE) measuring unit, adapted to measure a QoE value, and compare the measured QoE value with a QoE threshold; and a mode adjusting unit, adapted to adjust at least one of a source coding mode and a channel coding mode according to a result of the comparison.

A coding system based on measuring Quality of Experience (QoE) of a user includes:

user equipment, adapted to measure a QoE value, compare the measured QoE value with a first QoE threshold, adjust a channel coding mode according to a result of the comparison, and notify a result of the adjustment to a base station; and the base station, adapted to receive the result of the adjustment from the user equipment, and change the channel coding mode of the user equipment according to the result of the adjustment.

A coding system based on measuring Quality of Experience (QoE) of a user includes:

destination user equipment, adapted to measure a QoE value, compare the measured QoE value with a second QoE threshold, adjust a source coding rate according to a result of the comparison, and notify a result of the adjustment to source user equipment; and the source user equipment, adapted to receive the result of the adjustment from the destination user equipment, and change the source coding rate of the destination user equipment according to the result of the adjustment.

A resource allocating method based on measuring Quality of Experience (QoE) of a user includes:

measuring, at destination user equipment, a QoE value; adjusting at least one of a source coding rate and a channel coding mode according to the measured QoE value; and determining a wireless resource required for data transmission according to the adjusted source coding rate and/or channel coding mode.

As can be seen from the above technical solutions, the coding method, user equipment and system based on measuring Quality of Experience of the user adjust the coding technique according to the QoE. If the QoE is good, the channel coding mode is changed into the high order or the source coding rate is decreased. If the QoE is too poor, the source coding rate is increased or the channel coding mode is changed into the low order. Therefore, the wireless resources can be used reasonably.

DETAILED DESCRIPTION OF THE INVENTION

To make the objects, technical solutions and advantages of the present invention more apparent, the present invention is described in detail hereinafter with reference to the accompanying drawings and the embodiments.

Figure 1:
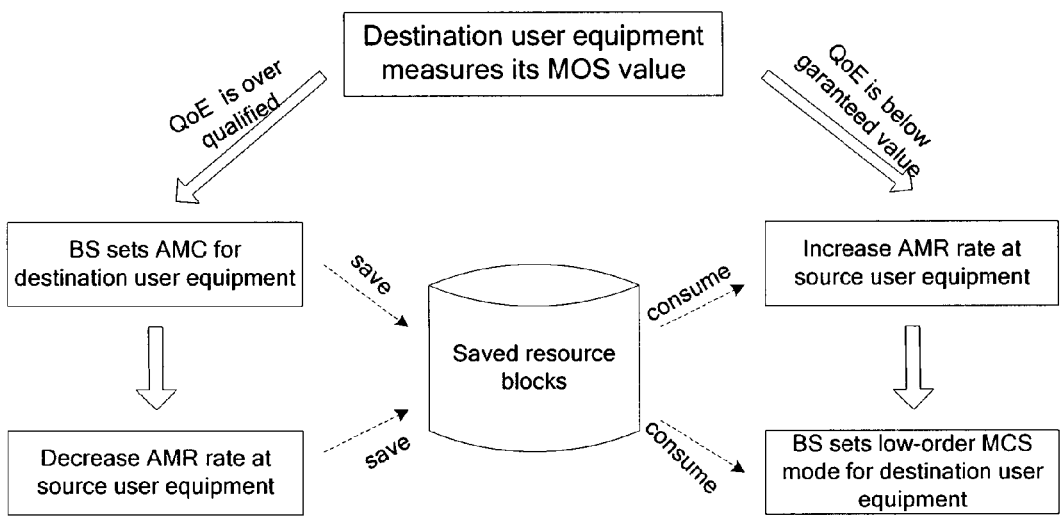
FIG. 1 is a diagram illustrating a basic principle of the present invention.

The existing communication system has a limited capacity. When the communication quality of a user is excessively good, it indicates that this user may occupy excessive wireless resources, which indirectly results in the reduction of wireless resources available for other users in the system. Therefore, an embodiment of the present invention includes a coding method, whose specific principle is illustrated in FIG. 1. The coding method mainly includes: measuring the communication quality of user equipment (UE) to determine whether its wireless resource occupation is reasonable, and adjusting coding technique for the user equipment when the resource occupation is unreasonable so that allocation and occupation of the wireless resources tend to be reasonable in the whole system. The communication quality of the user equipment is measured by a measured Quality of Experience (QoE) value of the user. Particularly, the measured QoE value may be Mean Opinion Score (MOS) of voice.

In the coding method provided by the present invention, destination user equipment measures its MOS value periodically, and compares it with a guaranteed value. If the measured MOS is above a certain guaranteed value, it indicates that it is required to adjust the coding technique to a state in which less resources are occupied. If the measured MOS value is below a certain guaranteed value, it indicates that it is possible to adjust the coding technique to a state in which more resources are occupied. By adjusting the coding technique, the MOS value of the user equipment is changed and thus resource block consumption of the user equipment is changed, thereby realizing a balance between the resource occupation and the communication quality.

Specifically, adjusting the coding technique to a state in which less resources are occupied may refer to decreasing the source coding rate regarding the source coding, while may refer to changing a coding mode from a low order to a high order regarding the channel coding. Correspondingly, adjusting the coding technique to a state in which more resources are occupied may refer to increasing the source coding rate regarding the source coding, while may refer to changing the coding mode from the high order to the low order regarding the channel coding.

In the channel coding, when a Modulation and Coding Scheme (MCS) is set for the user equipment, the following 8 basic MCS modes (sorted as follows according to the modulation mode and/or the coding rate from the low order to the high order) may be used: BPSK 1/2, QPSK 1/2, QPSK 2/3, QPSK 3/4, 16-QAM 1/2, 16-QAM 9/16, 16-QAM 3/4, 64-QAM 3/4. For example, QPSK1/2 refers to a Turbo code of 1/2 rate with QPSK. For another example, 64-QAM 3/4 refers to a Turbo code of 3/4 rate with 64QAM. In average, the high-order basic MCS mode has a higher packet loss rate than the low-order basic MCS mode.

Furthermore, considering whether it is time variable or not, the MCS mode set for the user equipment is divided into: a fixed MCS mode and an Adaptive Modulation and Coding (AMC) mode.

Specifically, the fixed MCS mode means that the same basic MCS mode is always used for a certain user, i.e. the MCS mode set for the user is not varied with time.

The AMC mode means that a suitable mode is selected from a group consisting of several basic MCS modes according to variation of the user's channel condition with time, i.e. the MCS mode set for the user varies with time. For example, in a system employing the AMC mode, the user in a better channel condition is usually allocated with a higher-order modulation manner or coding rate (such as 64-QAM 3/4); while the user in a poorer channel condition is allocated with a lower-order modulation manner or coding rate (such as QPSK 1/2). It should be noted that, commonly-used modulation and coding manners in the AMC mode include: BPSK 1/2, QPSK 1/2, QPSK 2/3, QPSK 3/4, 16-QAM 1/2, 16-QAM 9/16, 16-QAM 3/4 and 64-QAM 3/4, where BPSK 1/2 is the lowest-order mode in the AMC mode. That is, the AMC mode dynamically selects one of the above 8 basic MCS modes. Therefore, except the case that the fixed MCS mode is the 64-QAM 3/4 mode, any other fixed MCS mode is a MCS mode having a lower order than the AMC mode, i.e. occupies more resources than the AMC mode. Certainly, the basic MCS modes which may be dynamically selected for the AMC mode may also be adjusted, for example, when dynamic adjustment is performed, one basic MCS mode can be selected only from 4 basic MCS modes.

It should be noted that, when the coding adjustment is performed according to the MOS value, changing the low-order fixed MCS mode to the AMC mode may bring effectiveness as follows:

(1) The user in a better channel condition may be allocated with a higher-order modulation manner and coding rate, which can increase the average data throughput of the whole cell; (2) compared with a transmission power control method, the link-level AMC based on changing the modulation coding manner can reduce interference variation; and (3) with the combination of the AMC and time-domain scheduling, the user equipment may be in a low-fading state by using the fast fading characteristics of the user equipment.

In 3GPP LTE, the fastest execution frequency of the AMC mode may be one frame (1 ms). In the estimation related to HSDPA in the 3GPP TR 25.848, the AMC at every 4 HSDPA physical frames (8 ms) may not result in serious performance deterioration in the scenario of a relatively-low-speed user. Furthermore, in 3GPP LTE, because of the AMC downlink signaling overhead, a cell with 10 MHZ bandwidth can support at most 200 users using the AMC mode, and uplink CQI feedback overhead (i.e. 8 ms AMC delay) may occupy 3% of system signaling overhead. Therefore, the control signaling overhead of a certain number of AMC users is acceptable.

Further, regarding the source coding, the destination user equipment determines an adjustment result according to a relationship between the guaranteed value and the measured MOS value, and has the adjustment result carried in a Real-time Transport Protocol (RTP) message to be transmitted to source user equipment.

In the channel coding, as to the case that the MCS mode after adjusted turns to the AMC mode, the destination user equipment only needs to send a start resource request carrying the CQI to the base station, so as to trigger the base station to perform the channel coding for the destination user equipment by using the AMC mode. The start resource request is existing signaling. In a specific implementation approach, the CQI is represented by 4 bits and has 16 levels in total.

As to other cases, the destination user equipment notifies the base station of the adjustment result, and the base station modifies the MCS mode of the user equipment. The adjustment result may be the MCS mode determined by the destination user equipment. In specific implementation, the destination user equipment may notify the base station of the adjustment result through newly-added signaling from the destination user equipment to the base station.

Figure 2:
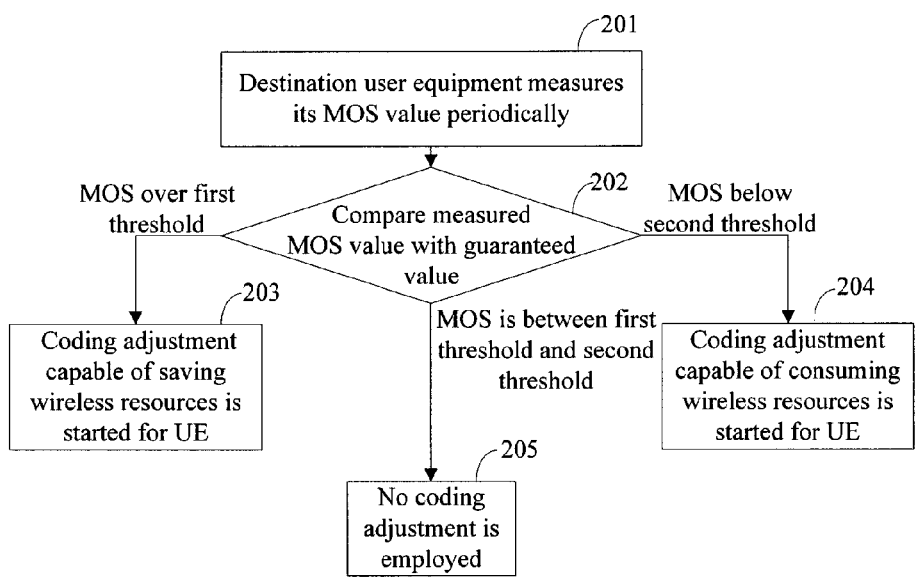
FIG. 2 is a flowchart illustrating a coding method according to an embodiment of the present invention.

Hereinafter, with reference to a specific example, the coding method based on MOS measurement according to the present invention is described and the specific procedure is illustrated in FIG. 2.

Step 201: At certain user equipment, the MOS value of the user is measured periodically. Or alternatively, this step may also be executed at the base station side.

Preferably, the measurement of the MOS value may be: calculating the MOS value of the user by using an E-Model scheme according to Formulas (1) and (2).

$$R = Ro - Is - Id - Ie + A \quad (1)$$

Where, Ro is a basic factor, which is determined by noise level and signal loudness; Is is signal impairment occurring together with the voice, which includes loudness, quantizing distortion and non-optimized side-tone level; Id is impairment lagging the voice, which includes session difficulty resulted from echoes and delays; Ie is a device impairment factor, which includes the influence on the transmission signal by the VoIP system, and the influence by the packet loss rate and the source coding rate, etc.; A is an advantage factor, which refers to the expected factor when the user is calling, e.g. the mobile phone can be used conveniently and thus people are more tolerant of problems related to conversation quality when using it. It should be noted that, factors such as the delay, the packet loss rate and the source coding rate in the two parameters Id and Ie should be taken into major account when R is calculated.

$$MOS = \begin{cases} 1 & , R < 0 \\ 1 + 0.035R + R(R-60)(100-R)7 \cdot 10^{-6} & , 0 < R < 100 \\ 4.5 & , R > 100 \end{cases} \quad (2)$$

Regarding the E-Model scheme, no manual participation is required and no original voice data need be provided when the measurement is performed, thus further facilitating the measurement at the user equipment. However, the MOS measurement of the present invention is not limited to the E-Model scheme and may use another scheme instead.

Step 202: The measured MOS value is compared with the guaranteed value. The guaranteed value may be one or more thresholds. If the MOS value of the user is above a first threshold, i.e. the user enjoys an excessively good service experience, Step 203 is executed. If the MOS value of the user is below a second threshold, i.e. a guaranteed service experience is not achieved, Step 204 is executed. If the MOS value of the user is between the first threshold and the second threshold, Step 205 is executed.

Specifically, the first threshold and the second threshold are set in advance for reflecting the basic service experience that the user should enjoy, and these thresholds may be adjusted according to requirements. For example, the first threshold may be set as 4.05 and the second threshold may be set as 4. Furthermore, different first QoE thresholds and second QoE thresholds may be set for different users in the system. A first QoE threshold and a second QoE threshold may be determined according to a user type, an accepted service type, a current service state and a service priority, etc. For example, the user type may correspond to a mobile phone user or a data card user; the accepted service type may correspond to a voice service or a data downloading service; the current service state may be an active state or an idle state; and the service priority may be a high priority or a low priority. Further, for the user under a femtocell base station, the first QoE threshold and the second QoE threshold may also be determined according to whether the user is a member of a Closed Subscriber Group or a member of a non-Closed Subscriber Group.

Step 203: Coding adjustment capable of saving wireless resources is started for the user equipment, and the data of the user equipment are coded and transmitted using the adjusted coding technique. Specifically, the coding adjustment for saving resources is divided into channel coding adjustment in Step 2031 and source coding adjustment in Step 2032. In practical applications, when the adjustment for saving wireless resources is performed, it may be possible to perform the channel coding adjustment first. If the channel coding adjustment does not meet the requirements, the source coding adjustment is then started. That is, the source coding adjustment in Step 2032 is optional. Specifically, suppose that the user is a VoIP user, the VoIP user uses semi-persistent scheduling for the channel coding before the adjustment, i.e. always uses the QPSK mode before the adjustment.

2031: The channel coding mode of the user is adjusted from the QPSK mode to the AMC mode, so as to save part of the resources. Compared with the QPSK mode, the AMC mode may appropriately decrease the MOS value of the user, thus saving the resources.

Certainly, adjusting the QPSK mode to the AMC mode is just a specific example, and the present invention is not limited thereto. In order to achieve the objective of saving resources, as long as the channel coding mode of the user is adjusted from the low-order MCS mode to the high order mode (e.g. adjust the BPSK 1/2 mode to the 16-QAM 1/2 mode, or adjust the AMC mode to the 64-QAM 3/4 mode), the MOS value of the user may be appropriately decreased, thus saving the resources.

2032: If the MOS value is still too high after the channel coding adjustment is applied to the user, the source coding rate of the user is further decreased.

For example, part of the resources may also be saved by decreasing the coding rate of the Adaptive Multi-Rate (AMR). It should be noted that the AMR technique is mainly applied to audio of the mobile device and is mostly applied to human voice, conversation, etc. Generally, eight different coding rates are set for the AMR. Using the AMR of a lower rate may consume less wireless resources, meanwhile the MOS value of the user may also be decreased. Using the AMR of a higher rate may consume more wireless resources, meanwhile the MOS value of the user may be increased.

Step 204: Coding adjustment capable of consuming wireless resources is started for the user equipment, and the data of the user equipment are coded and transmitted using the coding technique after adjusted. Specifically, the coding adjustment for consuming wireless resources is divided into the source coding adjustment in Step 2041 and the channel coding adjustment in Step 2042. In practical applications, when the adjustment for consuming wireless resources is performed, it is possible to perform the source coding adjustment first, which differs from Step 203. If the source coding adjustment does not meet the requirements, the channel coding adjustment is then started. That is, the channel coding adjustment in Step 2042 is optional.

2041: The AMR rate of the user is increased, so as to increase the MOS value of the user and enable the user to obtain a better service experience. This process may consume part of the wireless resources. Table 1 shows the resource consumption amounts of various AMR rates when the channel coding mode is fixed to QPSK 2/3.

TABLE 1

| AMR Codec Mode | The number of bytes after compressed (bytes) | FDD DL (PRBs) | FDD UL (PRBs) |
|---|---|---|---|
| AMR 4.75 kbps | 17~29 | 1~2 | 1~2 |
| AMR 5.15 kbps | 18~30 | 1~2 | 1~2 |
| AMR 5.90 kbps | 19~31 | 1~2 | 1~2 |
| AMR 6.70 kbps | 21~33 | 2 | 2 |
| AMR 7.40 kbps | 23~35 | 2 | 2 |
| AMR 7.95 kbps | 25~37 | 2 | 2 |
| AMR 10.2 kbps | 30~42 | 2~3 | 2~3 |
| AMR 12.2 kbps | 35~47 | 2~3 | 2~3 |
| AMR SID | 10~22 | 1~2 | 1~2 |

2042: If the AMR rate has reached the highest rate but the MOS value of the user does not meet the requirements yet, the AMC control is cancelled so that the user equipment enters the fixed MCS mode (e.g. enters the QPSK mode). This process may further consume the wireless resources.

Step 205: The measured MOS value is between the first threshold and the second threshold, and it is determined that the user equipment has the appropriate MOS value. The procedure is terminated.

When Step 203 or Step 204 is executed, after the source and/or channel coding scheme is adjusted, because different coding schemes correspond to different wireless resource occupation, the wireless resources allocated to the user may also be adjusted accordingly. For example, the source coding rate is adjusted from AMR 5.90 kbps to AMR 10.2 kbps, the physical resource blocks (PRB) occupied by the FDD DL may be adjusted from 1-2 to 2-3. That is, the number of Resource Blocks (RBs) required in the data transmission may be determined according to the determined source and/or channel coding scheme, and the Resource Blocks required may be allocated to the user.

Figure 3:
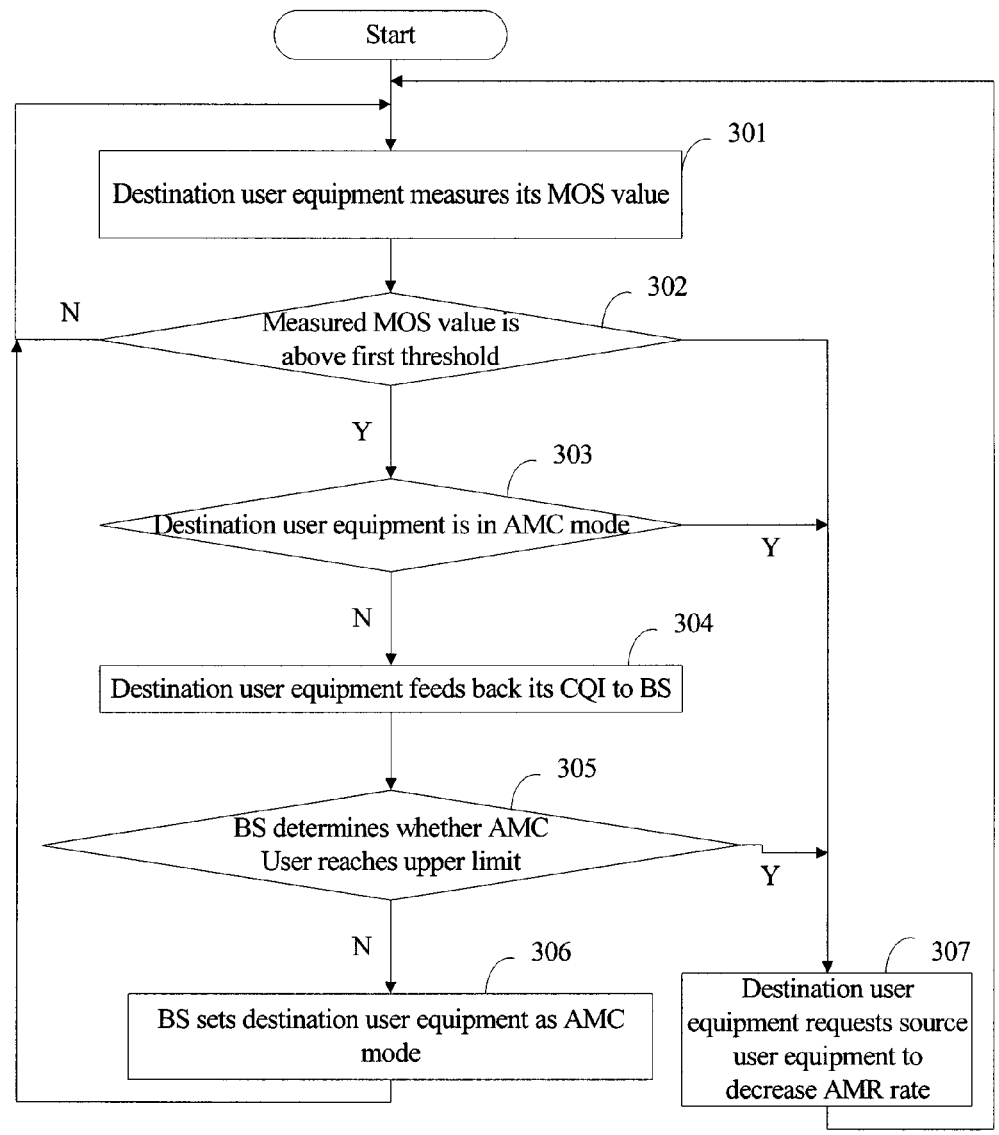
FIG. 3 is a flowchart illustrating coding adjustment when measured MOS is over a first threshold according to an embodiment of the present invention.

FIG. 3 is a flowchart illustrating coding adjustment when a measured MOS value is above a first threshold according to an embodiment of the present invention, which specifically includes steps as follows.

Step 301: The destination user equipment measures its MOS value. Such measurement may be performed periodically, or be initiated at a certain time.

Step 302: It is determined whether the measured MOS value is above the first threshold; if yes, Step 303 is executed; otherwise, the Step 301 is executed again.

Step 303: It is determined whether the destination user equipment is in the AMC mode; if yes, Step 307 is executed; otherwise, Step 304 is executed.

Step 304: The destination user equipment feeds back the actual CQI to the base station (BS).

Step 305: The base station determines whether the number of users using the AMC mode in the coverage of the base station reaches an upper limit; if yes, Step 307 is executed; otherwise, Step 306 is executed.

Step 306: The base station sets the MCS mode of the destination user equipment as the AMC mode, and Step 301 is then executed again.

Step 307: The destination user equipment requests the source user equipment to decrease the AMR rate of the destination user equipment, and Step 301 is then executed again.

Figure 4:
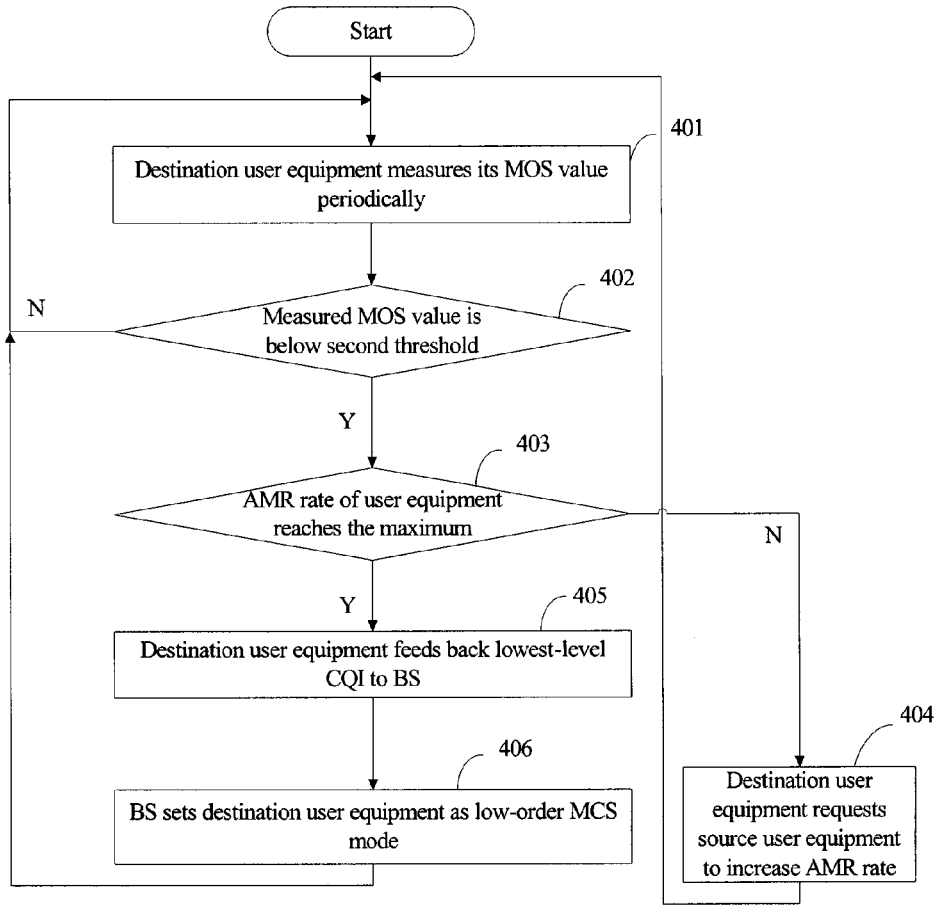
FIG. 4 is a flowchart illustrating the coding adjustment when the measured MOS is below a second threshold according to an embodiment of the present invention.

FIG. 4 is a flowchart illustrating the coding adjustment when the measured MOS value is below a second threshold according to an embodiment of the present invention, which specifically includes steps as follows.

Step 401: The destination user equipment measures its MOS value periodically.

Step 402: It is determined whether the measured MOS value is below the second threshold; if yes, Step 403 is executed; otherwise, Step 401 is then executed again.

Step 403: It is determined whether the AMR rate of the destination user equipment reaches the maximum; if yes, Step 405 is executed; otherwise, Step 404 is executed.

Step 404: The destination user equipment requests the source user equipment to increase the AMR rate, and Step 401 is executed again.

Step 405: In order to decrease the MCS mode from the AMC mode to the low order, the destination user equipment feeds back the lowest-level CQI to the base station.

It should be noted that, the CQI fed back at this time may not be the actual CQI, but just the one for decreasing the MCS mode to the low order by using the existing signaling (e.g. start resource request).

Step 406: The base station sets the destination user equipment as the low-order MCS mode, and Step 401 is then executed.

Figure 5:
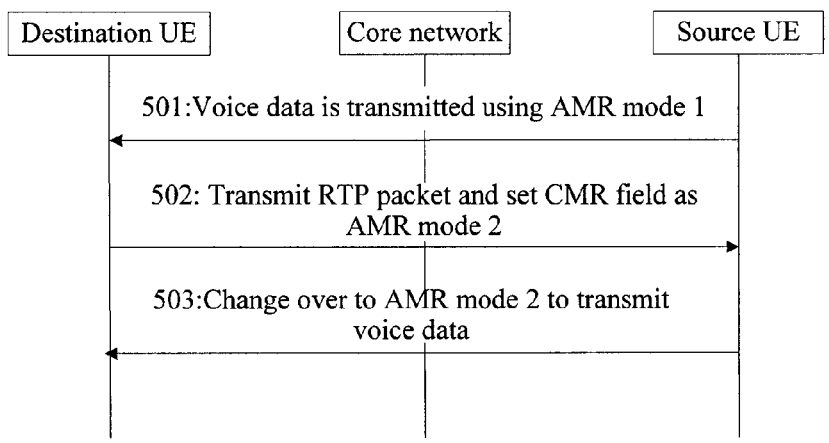
FIG. 5 is a flowchart illustrating AMR rate adjustment between destination user equipment and source user equipment according to an embodiment of the present invention.

FIG. 5 is a flowchart illustrating AMR rate adjustment between destination user equipment and source user equipment according to an embodiment of the present invention, which is specifically as follows.

Step 501: The source user equipment and the destination user equipment transmit voice data by using AMR mode 1 over the core network.

Step 502: The destination user equipment sends an RTP packet, and sets a Codec Mode Request (CMR) field therein as AMR mode 2.

Figure 6:
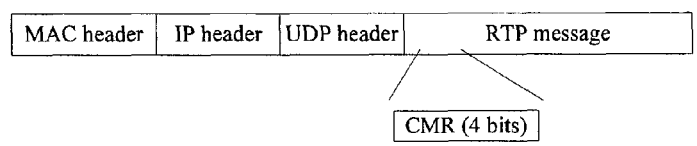
FIG. 6 is a schematic diagram illustrating a format of an RTP message transmitted between the destination user equipment and the source user equipment.

It should be noted that the AMR rate used in the data transmission is determined by the source user equipment (i.e. the coding end). When the destination user equipment (i.e. the decoding end) determines by measuring the MOS value that the AMR rate need be adjusted, the destination user equipment sends the RTP packet to the source user equipment, writes an expected AMR rate into the CMR field of the RTP packet header, and requests the source user equipment to modify the AMR rate according to the expected AMR rate. The RTP packet transmitted between the destination user equipment and the source user equipment is illustrated in FIG. 6. Furthermore, Table 2 shows specific contents of the CMR field. As can be seen, the AMR mode 1 is 5.15 kbit/s and the AMR mode 2 is 5.90 kbit/s.

TABLE 2

| 4 Bits (Binary) | Frame Type | Mode Indication | Frame Contents (Including Mode, Comfort Noise, or other) |
|---|---|---|---|
| 0000 | 0 | 0 | 4.75 kbit/s |
| 0001 | 1 | 1 | 5.15 kbit/s |
| 0010 | 2 | 2 | 5.90 kbit/s |
| 0011 | 3 | 3 | 6.70 kbit/s (PDC-EFR) |
| 0100 | 4 | 4 | 7.40 kbit/s (TDMA-EFR) |
| 0101 | 5 | 5 | 7.95 kbit/s |
| 0110 | 6 | 6 | 10.2 kbit/s |
| 0111 | 7 | 7 | 12.2 kbit/s (GSM-EFR) |
| 1000 | 8 | — | AMR-SID |
| 1001 | 9 | — | GSM-EFR |

TABLE 2-continued

| 4 Bits (Binary) | Frame Type | Mode Indication | Frame Contents (Including Mode, Comfort Noise, or other) |
|---|---|---|---|
| 1010 | 10 | — | TDMA-EFR |
| 1011 | 11 | — | PDC-EFR |
| 1100 | 12 | — | For future use |
| 1101 | 13 | — | For future use |
| 1110 | 14 | — | For future use |
| 1111 | 15 | — | No Data (No transmission/ No reception) |

Step 503: The source user equipment changes over to the AMR mode 2 to transmit the voice data to the destination user equipment.

As can be seen, embodiments of the present invention can make effective use of the wireless resources in the cell, thus improving the system capacity and the satisfaction degree. Particularly, FIGS. 7-9 are schematic diagrams illustrating effectiveness after using the solutions of the present invention, wherein the initial state of the user is the QPSK 2/3 mode and the Half-rate AMR mode (i.e. the AMR mode 3 with the rate of 6.7 kbps).

Figure 7A:
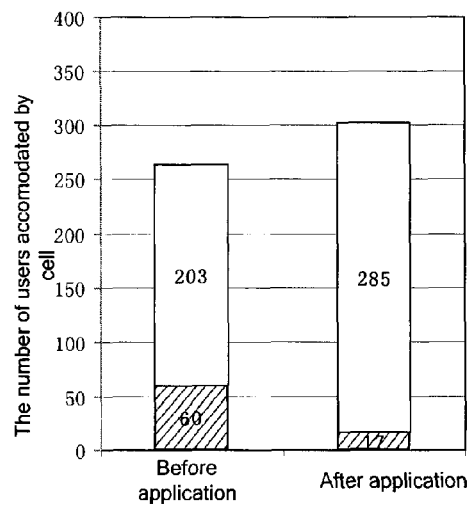
FIG. 7a and FIG. 7b are schematic diagrams illustrating comparison of a system capacity and a satisfaction degree before AMC control and AMR control with those thereafter according to an embodiment of the present invention.
Figure 7B:
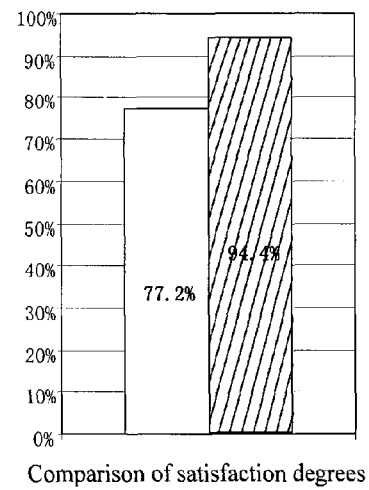

FIG. 7a and FIG. 7b are schematic diagrams illustrating comparison of a system capacity and a satisfaction degree before AMC control and AMR control with those thereafter according to an embodiment of the present invention. Before the coding adjustment is applied, the number of users that the system can accommodate is 263, including 203 satisfied users and 60 dissatisfied users (represented by the inclined lines). After the coding adjustment is performed by using the AMC and AMR control simultaneously, the number of users that the system can accommodate is increased to 302, including 285 satisfied users and 17 dissatisfied users (represented by the inclined lines). Through the above adjustment, the system capacity is increased by 14.8%. Regarding the user satisfaction degree, it is 77.2% before the coding adjustment is employed, and it is 94.4% after the coding adjustment is employed (represented by the inclined lines).

Figure 8A:
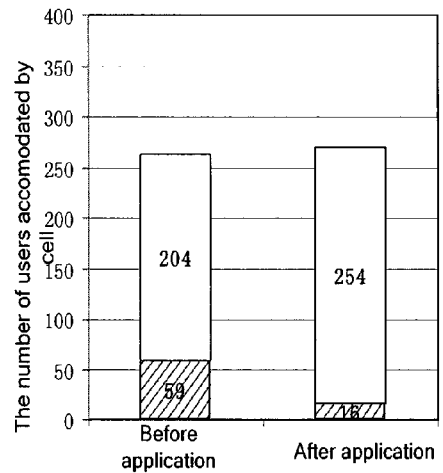
FIG. 8a and FIG. 8b are schematic diagrams illustrating comparison of a system capacity and a satisfaction degree before AMR control with those thereafter according to an embodiment of the present invention.
Figure 8B:
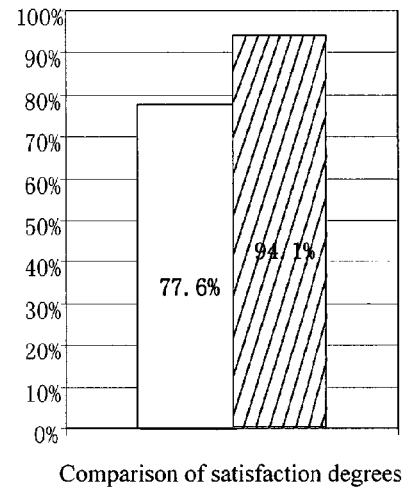

FIG. 8a and FIG. 8b are schematic diagrams illustrating comparison of a system capacity and a satisfaction degree before AMR control with those thereafter according to an embodiment of the present invention. Before the coding adjustment is applied, there are 204 satisfied users and 59 dissatisfied users (represented by the inclined lines). After the coding adjustment is performed by using only AMR control, there are 254 satisfied users and 16 dissatisfied users (represented by the inclined lines). Through the above adjustment, the system capacity is increased by 2.7%. Regarding the user satisfaction degree, it is 77.6% before the coding adjustment is employed, and it is 94.1% after the coding adjustment is employed (represented by the inclined lines).

Figure 9A:
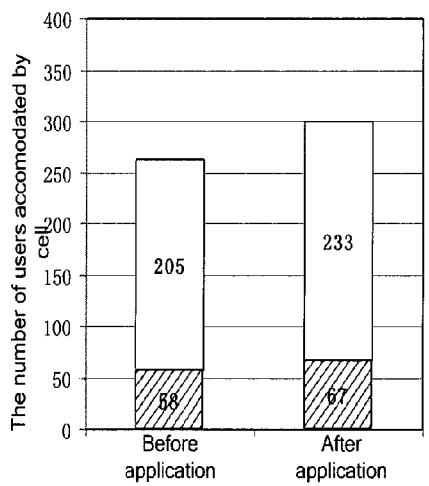
FIG. 9a and FIG. 9b are schematic diagrams illustrating comparison of a system capacity and a satisfaction degree before AMC control with those thereafter according to an embodiment of the present invention.
Figure 9B:
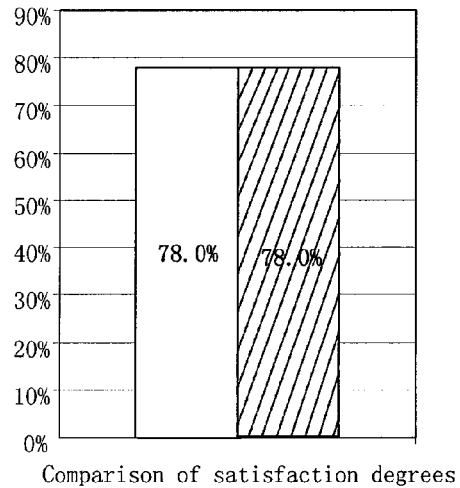

FIG. 9a and FIG. 9b are schematic diagrams illustrating comparison of a system capacity and a satisfaction degree before AMC control with those thereafter according to an embodiment of the present invention. Before the coding adjustment is applied, there are 205 satisfied users and 58 dissatisfied users (represented by the inclined lines). After the coding adjustment is performed by using only AMC control, there are 233 satisfied users and 67 dissatisfied users (represented by the inclined lines). Through the above adjustment, the system capacity is increased by 14.1%. Regarding the user satisfaction degree, it is 78.0% before the coding adjustment is employed and it is 78.0% after the coding adjustment is employed (represented by the inclined lines).

As can be seen, using the AMC and AMR control simultaneously may effectively improve both the system capacity and the user satisfaction degree at the same time. If only the AMR control is used, the user satisfaction degree may be improved effectively and the system capacity may be improved slightly. If only the AMC control is used, the system capacity may be improved effectively or the user satisfaction degree may be further improved quite slightly.

Further, an embodiment of the present invention also includes user equipment capable of initiating coding adjustment according to a QoE measurement result. The user equipment includes: a user QoE measuring unit, adapted to measure a QoE value and compare the measured QoE value with a preset QoE threshold; and a mode adjusting unit, adapted to adjust at least one of a source coding mode and a channel coding mode according to a result of the comparison.

Particularly, the preset QoE threshold includes a first threshold and a second threshold. The first threshold (QoE_Overqualified) is used for guaranteeing that the QoE of the user equipment is not excessively good, so as to avoid wasting the wireless resources, or in other words, the first threshold is the upper limit of the QoE. The second threshold (QoE_Guaranteed) is used for guaranteeing that the QoE of the user equipment is not too poor, so as to avoid affecting communication quality, or in other words, the second threshold is the lower limit of the QoE.

Furthermore, the present invention also provides a coding system based on measuring QoS of a user. The coding system includes:

user equipment, adapted to measure QoE value, compare the measured QoE value with a first QoE threshold, adjust a channel coding mode according to a result of the comparison, and notify a base station of a result of the adjustment; and the base station, adapted to receive the result of the adjustment sent from the user equipment, and change the channel coding mode of the user equipment according to the result of the adjustment.

If the measured QoE value is above the first QoE threshold, the user equipment notifies the base station to change the channel coding mode of the user equipment to a high order. Further, if the measured QoE value is below a second QoE threshold, the user equipment may alternatively notify the base station to change the channel coding mode of the user equipment to a low order.

Furthermore, the present invention also provides a coding system based on measuring QoS of a user. The coding system includes:

destination user equipment, adapted to measure a QoE value, compare the measured QoE value with a second QoE threshold, adjust a source coding rate according to a result of the comparison, and notify a result of the adjustment to source user equipment; and the source user equipment, adapted to receive the result of the adjustment sent from the destination user equipment, and change the source coding rate of the destination user equipment according to the result of the adjustment.

If the measured QoE value is below the second QoE threshold, the destination user equipment notifies the source user equipment to increase the source coding rate of the destination user equipment. Further, if the measured QoE value is above a first QoE threshold, the destination user equipment may also notify the source user equipment to decrease the source coding rate of the destination user equipment.

The foregoing are merely preferred embodiments of the present invention, and the present invention is not limited thereto. Any modifications, equivalents or improvements made without departing from the principle of the present invention are intended to fall into the scope of the present invention.

The invention claimed is:

1. A coding method based on measuring Quality of Experience (QoE) of a user, comprising:
   measuring, at destination user equipment, a QoE value of the destination user equipment; comparing the measured QoE value with a QoE threshold; adjusting at least one of a source coding rate and a channel coding mode according to a result of the comparison; and coding according to the adjusted source coding rate and/or channel coding mode;
   wherein comparing the measured QoE value with the QoE threshold and adjusting at least one of the source coding rate and the channel coding mode according to the result of the comparison comprise:
   if the QoE threshold is a first threshold, determining whether the measured QoE value is above the first threshold;
   if the measured QoE value is above the first threshold, modifying the channel coding mode of the destination user equipment to a mode having a higher order than an original mode, and measuring the QoE value of the destination user equipment again;
   if the QoE threshold is a second threshold, determining whether the measured QoE value is below the second threshold;
   if the measured QoE value is below the second threshold, requesting, by the destination user equipment, source user equipment to increase the source coding rate; modifying, by the source user equipment, the source coding rate of the destination user equipment according to the request; and measuring the QoE value of the destination user equipment again.

2. The coding method according to claim 1, wherein the mode having the higher order than the original mode is an Adaptive Modulation and Coding (AMC) mode;
   wherein modifying the channel coding mode of the destination user equipment to the mode having the higher order than the original mode comprises:
   feeding back, by the destination user equipment, a Channel Quality Indicator (CQI) to a base station; and
   determining, by the base station, whether the number of users using the AMC mode reaches an upper limit, setting the channel coding mode of the destination user equipment as the AMC mode if the number of the users using the AMC mode reaches the upper limit, and notifying the destination user equipment if the number of the users using the AMC mode does not reach the upper limit.

3. The coding method according to claim 1, wherein modifying the channel coding mode of the destination user equipment to the mode having the higher order than the original mode comprise:
   selecting, by the destination user equipment, the mode having the higher order than the original mode and notifying a base station of the mode having the high order; and
   modifying, by the base station, the channel coding mode of the destination user equipment according to the notification.

4. The coding method according to claim 1, further comprising: requesting, by the destination user equipment, source user equipment to decrease the source coding rate; modifying, by the source user equipment, the source coding rate of the destination user equipment according to the request; and measuring the QoE value of the destination user equipment again.

5. The coding method according to claim 4, wherein requesting the source user equipment to decrease the source coding rate by the destination user equipment comprises:
   determining, by the destination user equipment, the decreased source coding rate; including the decreased source coding rate into a Codec Mode Request (CMR) of a Real-time Transport Protocol (RTP) message to transmit the decreased source coding rate to the source user equipment.

6. The coding method according to claim 1, wherein requesting the source user equipment to increase the source coding rate by the destination user equipment comprises:
   determining, by the destination user equipment, the increased source coding rate, and including the increased source coding rate into a Codec Mode Request (CMR) of a Real-time Transport Protocol (RTP) message to transmit the increased source coding rate to the source user equipment.

7. The coding method according to claim 1, further comprising:
   requesting, by the destination user equipment, a base station to modify the channel coding mode to a mode having a lower order than an original mode; and measuring the QoE value of the destination user equipment again.

8. The coding method according to claim 7, wherein the original mode is an Adaptive Modulation and Coding (AMC) mode; the modifying the channel coding mode of the destination user equipment to the mode having the lower order than the original mode comprises:
   feeding back, by the destination user equipment, a lowest-level Channel Quality Indicator (CQI) to the base station; and
   setting, by the base station, the channel coding mode of the destination user equipment as a lowest-level mode in the AMC mode after receiving the CQI.

9. The coding method according to claim 7, wherein modifying the channel coding mode of the destination user equipment to the mode having the lower order than the original mode comprises:
   selecting, by the destination user equipment, the mode having the lower order than the original mode, and notifying the base station of the mode having the low order;
   modifying, by the base station, the channel coding mode of the destination user equipment according to the notification.

10. The coding method according to claim 1, wherein the first threshold or the second threshold is set according to at least one of parameters including a user type, an accepted service type, a current service state and a service priority.

11. The coding method according to claim 10, wherein the first threshold or the second threshold is set according to whether the user is a member of a Closed Subscriber Group.

12. The coding method according to claim 1, wherein the QoE value is a Mean Opinion Score (MOS) of voice.

13. User equipment, comprising:
   a user Quality of Experience (QoE) measuring unit, adapted to measure a QoE value, and compare the measured QoE value with a QoE threshold; and
   a mode adjusting unit, adapted to adjust at least one of a source coding mode and a channel coding mode according to a result of the comparison, change the channel coding mode of the user equipment into a mode having a higher order than an original mode if the measured QoE value is above the first QoE threshold, change the channel coding mode of the user equipment into a mode having a lower order than an original mode if the measured QoE value is below a second QoE threshold.

14. A coding system based on measuring Quality of Experience (QoE) of a user, comprising:
   user equipment, adapted to measure a QoE value, compare the measured QoE value with a first QoE threshold, adjust a channel coding mode according to a result of the comparison, change the channel coding mode of the user equipment into a mode having a higher order than an original mode if the measured QoE value is above the first QoE threshold, change the channel coding mode of the user equipment into a mode having a lower order than an original mode if the measured QoE value is below a second QoE threshold and notify a base station of a result of the adjustment; and
   the base station, adapted to receive the result of the adjustment from the user equipment, and change the channel coding mode of the user equipment according to the result of the adjustment.

* * * * *